United States Patent
Moore et al.

(10) Patent No.: US 10,054,516 B2
(45) Date of Patent: Aug. 21, 2018

(54) SYSTEM AND METHOD FOR OPTICAL FREQUENCY DOMAIN REFLECTOMETER

(71) Applicant: United States of America as represented by the Administrator of NASA, Washington, DC (US)

(72) Inventors: Jason P. Moore, Yorktown, VA (US); Matthew D. Rogge, San Francisco, CA (US)

(73) Assignee: THE UNITED STATES OF AMERICA AS REPRESENTED BY THE ADIMINSTRATOR OF NASA, Washington, DC (US)

( * ) Notice: Subject to any disclaimer, the term of this patent is extended or adjusted under 35 U.S.C. 154(b) by 0 days.

(21) Appl. No.: 15/689,203

(22) Filed: Aug. 29, 2017

(65) Prior Publication Data
US 2018/0058983 A1  Mar. 1, 2018

Related U.S. Application Data

(60) Provisional application No. 62/380,602, filed on Aug. 29, 2016.

(51) Int. Cl.
  *G01B 9/02* (2006.01)
  *G01M 11/00* (2006.01)
  (Continued)

(52) U.S. Cl.
  CPC ..... *G01M 11/3172* (2013.01); *G01D 5/35361* (2013.01); *G01D 5/3538* (2013.01); *G01K 11/32* (2013.01); *G01L 1/246* (2013.01)

(58) Field of Classification Search
  CPC .......... G01M 11/3172; G01D 5/35361; G01D 5/3538; G01K 11/32; G01L 1/246
  See application file for complete search history.

(56) References Cited

U.S. PATENT DOCUMENTS 5,917,598 A * 6/1999 Mason ............... G01L 3/12
                                                       356/491
6,208,415 B1 * 3/2001 De Boer ........... G01N 21/4795
                                                       356/450

(Continued)

OTHER PUBLICATIONS

Edward Collett, "Field Guide to Polarization," SPIE Press, 2005, pp. 7-9 and 57-61, ISBN 978081945681.

*Primary Examiner* — Hwa Lee
(74) *Attorney, Agent, or Firm* — Andrea Z. Warmbier; Robin W. Edwards; Mark P. Dvorscak

(57) ABSTRACT

Systems, methods, and devices of the various embodiments enable mitigation of the effects of birefringence in Optical Frequency Domain Reflectometer (OFDR) sensing fiber. Various embodiments enable the measurement of the polarization state of the light in a sensing fiber throughout the entire sensing cable in a highly distributed manner typical of OFDR systems. Various embodiments enable the production of a distributed fiber birefringence measurement throughout the length of an OFDR sensing fiber. Various embodiments may enable OFDR to be 100% polarization diverse, meaning that polarization effects in the fiber optic cables and sensing fiber do not negatively effect measurements. Additionally, the highly distributed measurement of the polarization state and related birefringence in a sensing fiber of the various embodiments may enable new types of measurements such as pressure, twisting, and bending along the sensing fiber.

17 Claims, 8 Drawing Sheets

(51) Int. Cl.
*G01D 5/353* (2006.01)
*G01L 1/24* (2006.01)
*G01K 11/32* (2006.01)

(56) References Cited

U.S. PATENT DOCUMENTS

| | | |
|---|---|---|
| 7,277,162 B2 | 10/2007 | Williams |
| 7,538,883 B2 | 5/2009 | Froggatt |
| 8,700,358 B1 | 4/2014 | Parker, Jr. |
| 2007/0019201 A1* | 1/2007 | Waagaard .............. G01D 5/345 356/478 |
| 2010/0141930 A1 | 6/2010 | Omichi et al. |
| 2015/0346053 A1 | 12/2015 | Lally et al. |

* cited by examiner

SYSTEM AND METHOD FOR OPTICAL FREQUENCY DOMAIN REFLECTOMETER

CROSS-REFERENCE TO RELATED PATENT APPLICATION(S)

This patent application claims the benefit of and priority to U.S. Provisional Patent Application No. 62/380,602 filed on Aug. 29, 2016, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Optical Frequency Domain Reflectometer (OFDR) systems are capable of making fiber optic (FO) based measurements of various physical parameters in a highly distributed manner. As an example of an OFDR's capability, a single strain sensing fiber 15 meters in length can provide strain measurements at 1 cm intervals throughout the entire fiber. An OFDR and the connected sensing fiber can be configured to measure distributed strain, temperature, and chemical presence, as examples, in several fibers simultaneously. OFDR systems are interferometric in nature, and thus depend on various components of light to interfere sufficiently enough to produce required signal-to-noise ratios for accurate measurements. Because the laser at the heart of an OFDR system is 100% polarized, measurements can be greatly affected (reduced accuracy) by birefringent effects in the FO cables outside of the system; in particular, the birefringent effects in the sensing fiber and the cable connecting the sensing fiber to the OFDR can alter the polarization states of the light components in such a way that productive interference does not occur.

BRIEF SUMMARY OF THE INVENTION

Systems, methods, and devices of the various embodiments enable mitigation of the effects of birefringence in Optical Frequency Domain Reflectometer (OFDR) sensing fiber. Various embodiments enable the measurement of the polarization state of the light in a sensing fiber throughout the entire sensing cable in a highly distributed manner typical of OFDR systems. Various embodiments enable the production of a distributed fiber birefringence measurement throughout the length of an OFDR sensing fiber. Various embodiments may enable OFDR to be 100% polarization diverse, meaning that polarization effects in the fiber optic cables and sensing fiber do not negatively impact measurements. Additionally, the highly distributed measurement of the polarization state and related birefringence in a sensing fiber of the various embodiments may enable new types of measurements such as pressure, twisting, and bending along the sensing fiber.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
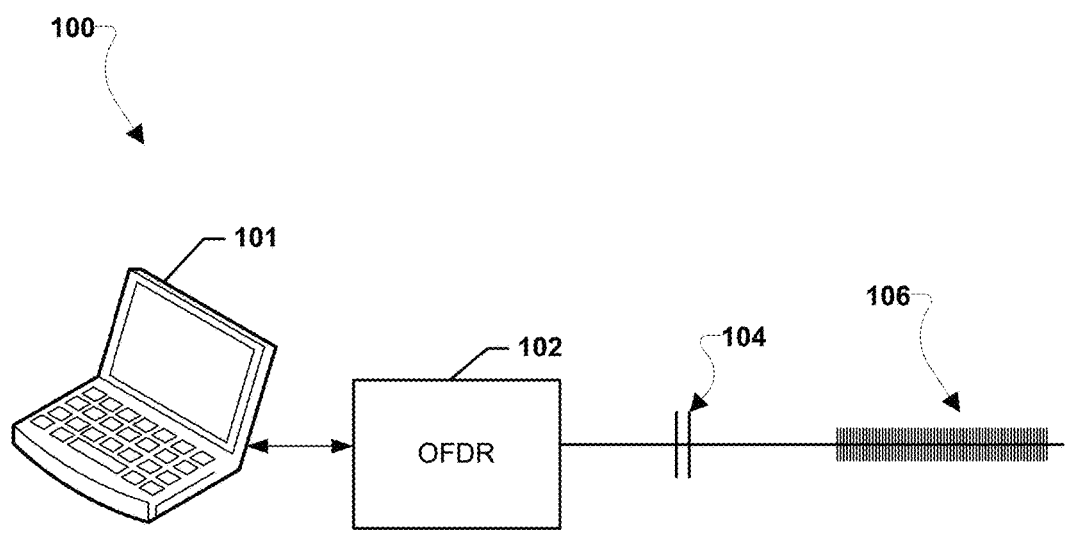
FIG. 1 is a diagram of an Optical Frequency Domain Reflectometer (OFDR) arrangement in which an OFDR is used to interrogate a sensing fiber full of Fiber Bragg Grating (FBG) sensors.

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "computing device" refers to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players, smart televisions, digital video recorders (DVRs), and similar electronic devices which include a programmable processor and memory and circuitry for performing the operations described herein.

Optical Frequency Domain Reflectometer (OFDR) technology has matured to the point of being used extensively in ground testing of large complex structures and there are some examples of OFDR systems configured for flight demonstrations. Even commercial off the shelf (COTS) OFDR systems are now available. These systems rely on well-formed interference between the light returning from the sensing fiber and some component of light that is not from the sensing fiber such as a broadband reflector inline of the OFDR and the sensing fiber. All of the light inside the optical fibers of an OFDR system is 100% polarized and is thus subject to all of the environmental factors that can affect the polarization state of the light. All of those different effects on polarization are generally categorized as "birefringence". The birefringence of an optical fiber will affect polarized light as it propagates through the fiber, causing the polarization state of the light to drift somewhere between linearly polarized and circularly polarized state. In between the purely linearly polarized state and the purely circularly polarized is the elliptically polarized state. Most of the time, the polarized light of an OFDR system is in an elliptically polarized state. It may drift toward linear or toward circular as the birefringence affects the polarization, but it will rarely reach purely linear or purely circular. Imagining a cross section of an optical fiber with optical energy propagating through it, the polarization state describes the angular location of the electric field of the light at that particular cross section of fiber.

The problem with polarization in an OFDR system is that because the system relies on well-formed interference between two different fields of light, if their respective polarization states are different enough, interference between the two light fields can be nearly non-existent. This situation is troublesome to accurate measurement in an OFDR system because ultimately an OFDR system is using the amplitude of the interference to make decisions concerning external phenomena on the sensors connected to the OFDR. If the interference is ill-formed, there is little amplitude on which to base a sensor measurement.

The various embodiment methods address and eliminate the "polarization problem" of an OFDR, i.e., the ill-formed interference in an OFDR sensing channel that can be caused when the electric field polarization states of the interfering light waves are not close to one another. The various embodiment methods enable the ill-formed interference in an OFDR sensing channel to be converted in to a "measurement".

An OFDR sends light out to a sensing fiber and mixes, or interferes, the light reflected from the sensing fiber with another segment of light to produce beat frequencies that are dependent on the differing travel path lengths between the two interfering light components. In the simplest form a partial-reflectivity (typically 25%-50% reflectivity) broad-band reflector is placed at the beginning of the sensing fiber to create the differing path lengths required for optical frequency domain reflectometry. Each sensor in the sensing fiber is physically located in its own space in the sensing fiber and is therefore at its own unique distance from the broad-band reflector. Therefore, as the laser of the OFDR is swept in wavelength (frequency), the detected return light from the broad-band reflector and the sensing fiber has many individual interferometric beat frequencies corresponding to the many individual sensor path lengths from the broad-band reflector. Through digital signal processing (DSP) the information (primarily amplitude information) at each beat frequency is filtered and processed as necessary. In the case of Fiber Bragg Grating (FBG) sensors, an OFDR will determine the peak reflection wavelength of each FBG along the sensing fiber. The entire process relies on well-formed interference between the light reflecting off the broad-band reflector and the light reflecting from each FBG along the fiber. The problem that arises is that the light reflecting from the broad-band reflector can be elliptically polarized but close to linear, and the light from an FBG, after propagating down the sensing fiber and back to remix with the broad-band reflected light, can be elliptically polarized but close to linear, but with the major axes of the polarization ellipse oriented orthogonal to the major axes of the broad-band reflected polarization ellipse.

One approach to mitigate the polarization problem in an OFDR sensing fiber uses a system of polarization control and couplers to generate well-controlled linearly polarized light in at least two different polarization axes that is ultimately mixed with light from the sensing fiber. In such an approach, there is no broad-band reflector and there will be multiple detectors for each sensing fiber. An OFDR system utilizing polarization control to form controlled linearly-polarized light mitigates the polarization problem, but is complicated, as it uses active polarization control devices and methods. The components, such as couplers, splitters, circulators, etc., used in such a system are more expensive than components forming a traditional OFDR system because the fiber optic network inside the system will have many polarization-maintaining components, which are more expensive than non-polarization-maintaining components. Additionally, the active polarization control devices increase cost.

Another approach to mitigate the polarization problem in an OFDR sensing fiber uses a broad-band reflector and splits all of the light returning from the broad-band reflector and the sensing fiber through two orthogonally positioned linear filters and the output of each filter is detected. The splitting and filtering is typically performed by a device known as a 2-axis polarization detector. The approach utilizing a simple 2-axis polarization diverse detector does not add significant cost to an OFDR system, but it actually does not totally eliminate the polarization problem. Two axes of filtering is also not adequate to resolve the polarization state of the light at individual locations along the sensing fiber.

The systems, methods, and devices of the various embodiments enable mitigation of the effects of birefringence in OFDR sensing fiber. Various embodiments enable the measurement of the polarization state of the light in a sensing fiber throughout the entire sensing cable in a highly distributed manner typical of OFDR systems. Various embodiments enable the production of a distributed fiber birefringence measurement throughout the length of an OFDR sensing fiber. Various embodiments may enable OFDR to be 100% polarization diverse, meaning that polarization effects in the fiber optic cables and sensing fiber do not negatively impact measurements. Additionally, the highly distributed measurement of the polarization state and related birefringence in a sensing fiber of the various embodiments may enable new types of measurements such as pressure, twisting, and bending along the sensing fiber.

Various embodiments provide the ability to achieve truly polarization diverse measurements in an OFDR system without the use of active polarization components. Additionally, the algorithms of the various embodiments for determining the distributed birefringence characteristics of an OFDR sensing fiber may enable sensing technology that depends on fiber birefringence to measure physical phenomena, such as pressure, temperature, chemical, and position, as examples.

The various embodiments may provide two primary advantages. The first may be that FBG detection information, primarily the maximum reflection wavenumber, is determinable no matter the polarization state of the light reaching the broad-band reflector and no matter the polarization state of the light at any FBG along the sensing fiber. This results in a 100% polarization independent OFDR sensing scheme without the use of active polarization sensing or controlling components in the OFDR optical network.

The second major advantage may be that birefringence along the sensing fiber is measured in a highly distributed manner, leading to many new types of distributed measurements using densely distributed FBG sensing fiber, such as pressure, chemical presence, and multi-core fiber twisting in a highly distributed manner along the entire length of an OFDR sensing fiber.

The various embodiments provide for cost effective mitigation of polarization effects that may degrade accuracy in an OFDR measurement system. The various embodiments provide a method of measuring polarization state in a highly distributed manner through a sensing fiber interrogated using an OFDR. Using a 3-axis polarization filtering arrangement, the light returning from a sensing fiber may be split three ways equally and each third of the return is linearly filtered before being opto-electronically converted and amplified. The linear filters on the three splitter outputs may be positioned at 0°, 60°, and 120° with respect to the cross section of the fibers emerging from the splitter. In various embodiments, the information from the three signals may be processed to give the polarization state in a highly distributed manner through the sensing fiber.

FIG. 1 is a diagram of an OFDR arrangement 100 in which an OFDR 102 is used to interrogate a sensing fiber 106 full of FBG sensors. Light from the OFDR 102 is carried to the broad-band reflector 104 where it is partially reflected (25-50% typical reflection coefficient). The light not reflected (transmitted) by the broad-band (BB) reflector 104 is directed to the sensing fiber 106 where sensors distributed in the fiber will fractionally reflect light back to the BB reflector 104. A portion of that light makes it past the BB reflector 104 to be combined with the light that was initially reflected by the BB reflector 104 and both light signals are carried back to the OFDR 102 together as a mixed light signal. The distance between the BB reflector 104 and the sensors throughout the sensing fiber 106 create frequency-domain interferometry when the laser inside the OFDR 102 is wavelength (frequency) swept. During a laser wavelength sweep, A/D converters sample the opto-electrical converted BB-sensing fiber return signal and the resulting digital data set is processed and analyzed by the recording/displaying computing device 101 to produce measurements of whatever desired phenomena for which the system 100 is intended. The sensing fiber 106 may include one or more sensors, such as one or more FBG sensors. The term FBG is used generally in this disclosure to describe the presence of a Fiber Bragg Grating in a sensing fiber as a peripheral piece of equipment. Precise specifications of an FBG is not required for the various embodiments, and other type sensors may be substituted for the FBG sensors discussed herein. The various sensors may be weakly reflecting or strongly reflecting, densely or sparsely distributed in the sensing fiber, which may be bonded to a surface, embedded, taped, or not secured at all, as examples of configurations.

Figure 2:
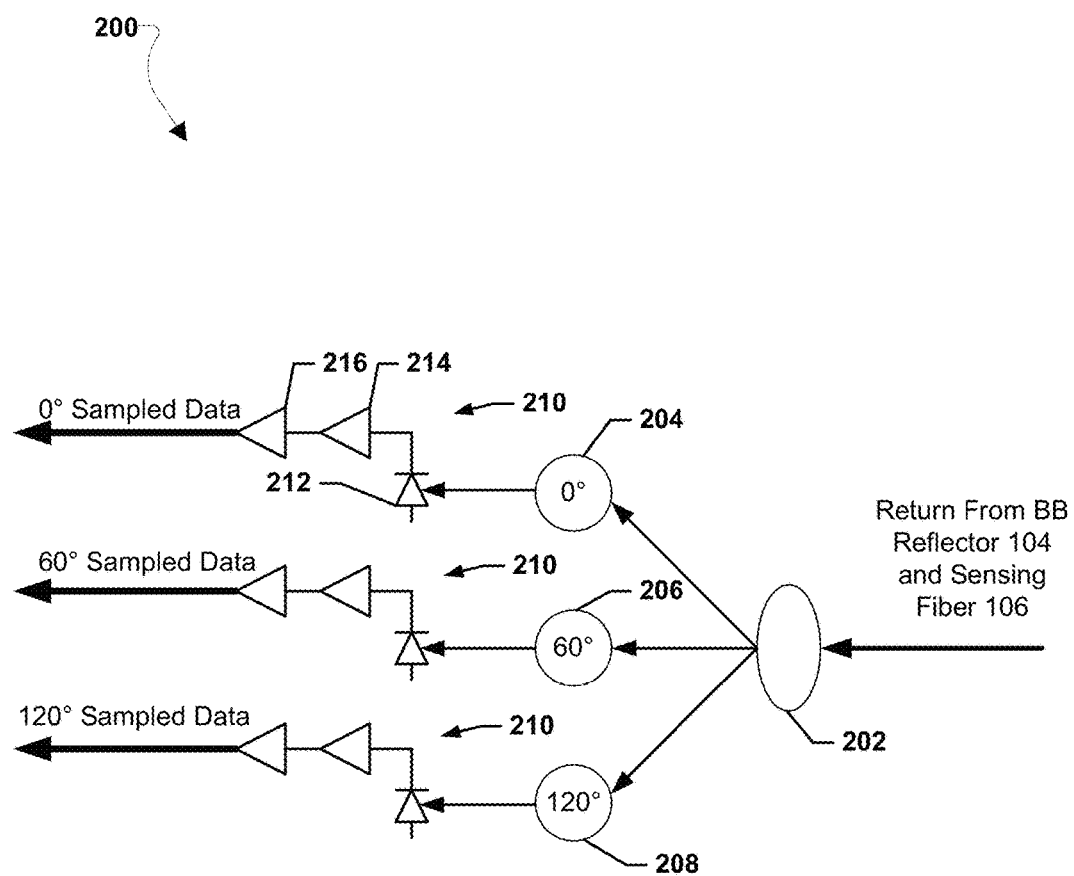
FIG. 2 is a diagram of a 3-axis polarization diverse photodetector arrangement according to various embodiments.

In various embodiments, a 3-axis polarization diverse photodetector arrangement 200 as shown in FIG. 2 is added to the OFDR 102 of the OFDR arrangement 100 of FIG. 1. The 3-axis polarization diverse photodetector arrangement 200 may include an optical splitter 202, such as a 1 to 3 optical splitter to split the BB-sensing fiber return signal into three different signals. Each of the three signals may be sent to a respective linear polarization filter, 204, 206, and 208, positioned at 0°, 60°, and 120°, respectively, with respect to the cross section of the fibers emerging from the splitter 202 before impacting the three separate detectors 212 of the three sampling circuits 210 each individual associated with the respective linear polarization filters 204, 206, and 208.

Each of the linear polarization filters 204, 206, and 208 has a unique angular filter orientation, i.e., 0°, 60°, and 120°, respectively. Each sampling circuit 210 may include a photo-detector 212, an amplifier 214, and an analog to digital A/D converter 216. The electrical signals from the detectors 212 are individually amplified (by their respective amplifier 214) and sampled (by their respective A/D converter 216) to produce three different sets of data (i.e., 0° sampled data, 60° sample data, and 120° sampled data) from one BB-sensing fiber return.

The splitter 202 may be a specific type of fiber optic coupler that inputs one source of light and transmits three equally divided outputs of the light. The connections of the splitter 202 may be any type connections adapted as needed. Linear polarization filters 204, 206, and 208 may be small bulk optic components that only allow linearly polarized light to transmit. The linear polarization filters 204, 206, and 208 may be passive in nature and reduce optical power to achieve linear polarization of the output. The angular orientation of the linear polarization filters 204, 206, and 208 may determine the angular orientation of the linear polarization output.

The computing device 101 may support the various embodiments using sensing various signal processing operations and software. The various algorithms may be implemented in general math-programming tools such as MATLAB or in broader programming tools such as C++, or may be implemented in dedicated digital signal processing (DSP) processing units such as field programmable gate arrays (FPGAs).

In operation, the OFDR system 100 including the 3-axis polarization diverse photodetector arrangement 200 may be controlled to output light from the OFDR 102 that is carried to the broad-band reflector 104 where it is partially reflected (25-50% typical reflection coefficient). The light not reflected (transmitted) by the broad-band (BB) reflector 104 is directed to the sensing fiber 106 where sensors distributed in the fiber will fractionally reflect light back to the BB reflector 104. A portion of that light makes it past the BB reflector 104 to be combined with the light that was initially reflected by the BB reflector 104 and both light signals are carried back to the OFDR 102 together as a mixed light signal. That mixed light signal is split by the optical splitter 202 which sends three light signals to their respective linear polarization filters 204, 206, and 208, positioned at 0°, 60°, and 120°, respectively. The resulting 0° light signal, 60° light signal, and 120° light signal may be opto-electronically converted, amplified, and sampled by their respective sampling circuits 210 resulting in the three different sets of data (i.e., 0° sampled data, 60° sample data, and 120° sampled data). Signal processing may be applied to the data sets to determine a broad-band polarization parameter calculation, a FBG peak reflection wavenumber calculation, a FBG polarization parameter calculation, and/or a sensing fiber birefringent calculation. The result may be displayed as a fiber birefringence measurement vs. fiber length, represented as β(K) and θ(K) where K represents the length indexing. The highly distributed measurement of the polarization state and related birefringence in the sensing fiber 106 may enable pressure, twisting, and/or bending measurements along the sensing fiber 106 to be determined and output on the display of the computing device 101.

Even though the sensing fiber 106 is traditionally densely populated with FBG sensors, it is easier in this discussion to consider the processing of a single FBG. For densely distributed FBG sensing fiber, the processing is exactly the same for every FBG in the sensing fiber. Consider only one FBG, the three returning sampled signals in FIG. 2 (i.e., 0° sampled data, 60° sample data, and 120° sampled data) may be represented by the following:

$$P_{LHP}(k) \propto E_{oLHP}^2(k) + E_{oLHP}(k)E_{gLHP}(k)$$
$$(e^{ik2nl_g} + e^{-ik2nl_g})$$

$$P_{60°P}(k) \propto E_{o60°P}^2(k) + E_{o60°P}(k)E_{g60°P}(k)$$
$$(e^{ik2nl_g} + e^{-ik2nl_g})$$

$$P_{120°P}(k) \propto E_{o120°P}^2(k) + E_{o120°P}(k)E_{g120°P}(k)$$
$$(e^{ik2nl_g} + e^{-ik2nl_g}) \quad (1)$$

$P_{LHP}$, $P_{60°P}$, $P_{120°P}$ are the signals sampled at the respective A/D converters 216, $E_{oLHP}^2(k)$, $E_{o60°P}^2(k)$, $E_{o120°P}^2(k)$, are the components of the broad-band reflected electric field transmitted through the respective polarization filters 204, 206, 208, k is the instantaneous wavenumber of the sweeping laser, $E_{gLHP}(k)$, $E_{g60°P}(k)$, $E_{g120°P}(k)$ are the components of the reflected FBG electric field transmitted through the respective polarization filters 204, 206, 208, n is the index of refraction of the sensing fiber 106, $l_g$ is the fiber length between the broad-band reflector 104 and the center of the FBG, and i is the typical imaginary number representation of the square root of negative one. While it appears that Equation (1) contains complex data, which is not possible for the sampling of a pure-real signal, the representation used in Equation (1) actually is pure-real, because:

$$e^{ik2nl_g} + e^{-ik2nl_g} = 2\cos(k2nl_g) \quad (2)$$

This notation is chosen to simplify understanding of the signal after Fourier transforming. Of note is that the electric field components are dependent on the wave-number of the laser. The effect of wave-number on the electric field components through the polarization filters 204, 206, 208 is slowly varying, however significant enough to require consideration. The signals of Equation (1) contain a DC component and a higher frequency component as represented by the sinusoidal term shown in Equation (2). The DC components of Equation (1) can be isolated through low-pass filtering of the data; the broad-band electric field components are minimally affected by the low-pass filter and Equation (1) becomes:

$$P_{LHP,LPF}(k) \propto E_{oLHP}^2(k)$$

$$P_{60°P,LPF}(k) \propto E_{o60°P}^2(k)$$

$$P_{120°P,LPF}(k) \propto E_{o120°P}^2(k) \quad (3)$$

Figure 3:
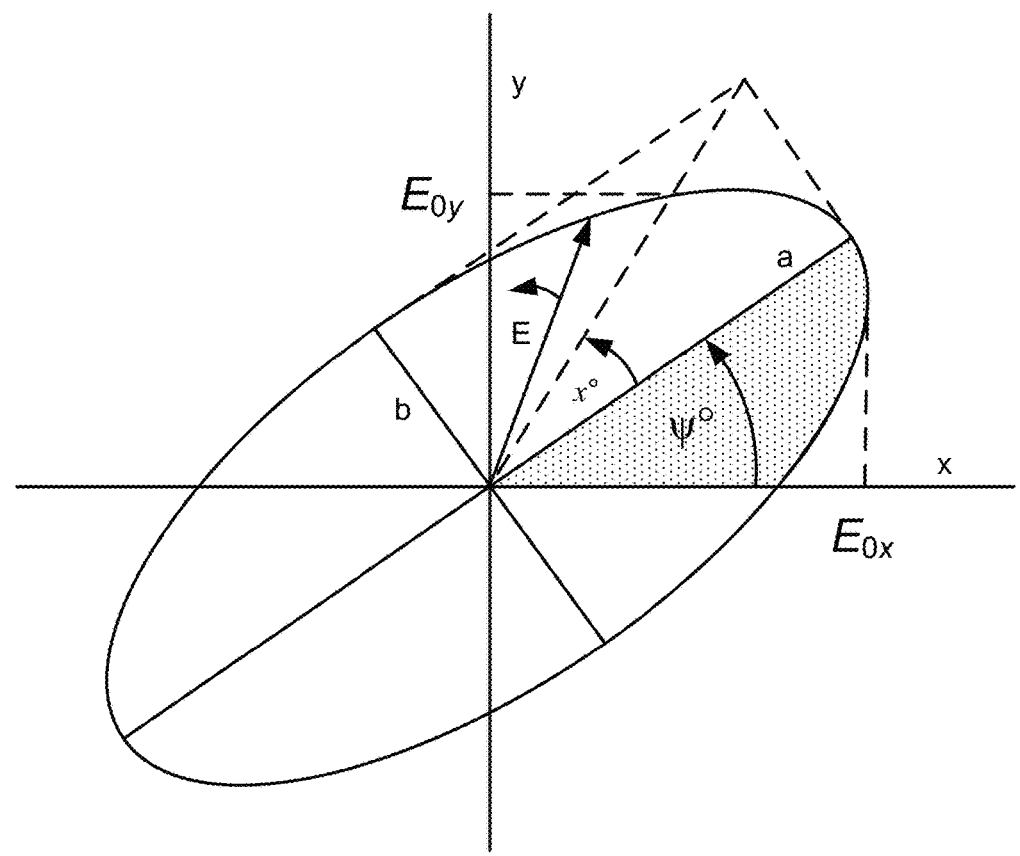
FIG. 3 is a diagram of a polarization ellipse and associated parameters.

Equation (3) may then used to determine the polarization state of light returning from the broad-band reflector 104 vs. laser wavenumber. The polarization ellipse for polarized light can be diagrammed as shown in FIG. 3. The vector form of polarized light with parameters shown in FIG. 3 is represented by:

$$E = \begin{bmatrix} E_{0x} \\ E_{0y}e^{i\delta} \end{bmatrix} \quad (4)$$

$E_{0x}$ is the component of the field in the x-axis, $E_{0y}$ is the component of the field in the y-axis, $\delta$ is the phase delay between the two electric field components, $\Psi$ is the orientation angle of the ellipse and $\chi$ is the ellipticity angle of the ellipse. Using the signals in Equation (1), the parameters of the polarization ellipse at the broad-band reflector 104 and the associated electric field vector is found by:

$$E_{0x} = \sqrt{P_{LHP}} \quad (5)$$

$$E_{0y}\sqrt{\frac{2}{3}\left(P_{L60°\ P} + P_{L120°\ P} - \frac{1}{2}P_{LHP}\right)} \quad (6)$$

$$\delta = \cos^{-1}\left(\frac{P_{L60°\ P} - P_{L120°\ P}}{\sqrt{3}\,E_{0x}E_{0y}}\right) \quad (7)$$

$$\Psi = \frac{1}{2}\tan^{-1}\left(\frac{2E_{0x}E_{0y}\cos\delta}{E_{0x}^2 - E_{0y}^2}\right) \quad (8)$$

Note that in Equations (5), (6), (7), and (8), the dependence on the wavenumber, k, is dropped for notation convenience, but the electric field components are still assumed to be varying vs. laser wavenumber. The result of Equations (5), (6), (7), and (8) is a set of polarization parameters describing the polarization state of the light at the broad-band reflector 104 vs. laser wavenumber, as the parameters are determined at every sampling point. In an OFDR system 100, the sampling of sensing fiber returns are directly dependent on wavenumber, so the original sampled set is always indexed to wavenumber. The determination of the polarization parameters vs. wavenumber at the broad-band reflector 105 may be necessary for the eventual determination of the polarization state at each FBG, all of which have some peak reflection at some wavenumber, which can change as the FBG's are axially stretched or compressed, subjected to temperature changes, or subjected to some other phenomena which the OFDR system 100 may be configured to measure.

With the polarization parameters of the broad-band reflected light determined, the traditional OFDR processing of the sampled sets of Equation (1) may be carried out, which is to Fourier transform the sets in order to separate FBG information based on length from the broad-band reflector 104. The Fourier transform of the signals of Equation (1) can generally be represented by:

$$\tilde{P}_{LHP}(k) \propto \tilde{E}_{oLHP}^2(k) + \tilde{E}_{oLHP}(k)\tilde{E}_{gLHP}(k)(\delta(k-2nl_g) + \delta(k+2nl_g))$$

$$\tilde{P}_{60°P}(k) \propto \tilde{E}_{o60°P}^2(k) + \tilde{E}_{o60°P}(k)\tilde{E}_{g60°P}(k)(\delta(k-2nl_g) + \delta(k+2nl_g))$$

$$\tilde{P}_{120°P}(k) \propto \tilde{E}_{o120°P}^2(k) + \tilde{E}_{o120°}P(k)\tilde{E}_{g120°}P(k)$$
$$(\delta(k-2nl_g) + \delta(k+2nl_g)) \quad (9)$$

Equation (9) could be rigorously dealt with, however for practical implementation it is worth introducing simplifications based on the usual behavior of FBGs. Firstly, the squared broad-band reflection terms are sufficiently slowly varying vs. wavenumber such that those terms are grouped at or near DC relative to the location of FBG information; therefore, those terms are neglected in the remaining processing, Secondly, in Equation (1), the $E_{gXXP}(k)$ terms are actually approximated as sinc functions that peak at some wavenumber, $k_g$, and have a width dependent on the length of the FBG in the fiber. The Fourier transform of a sinc function is a hat function with a phase derivative dependent on the reflection wavenumber. Thirdly, because the FBG reflection spectrum varies much faster vs. wave number than the broad-band electric field return, only the value of the broad-band electric field components at the wave-number of the peak reflection of the FBG is needed. Combining those three assumptions gives:

$$\tilde{P}_{LHP,FBG}(k) \propto E_{oLHP}(k_g)E_{gLHP,max}\Pi(n\beta)e^{-i\beta k_g}$$
$$(\delta(k-2nl_g) + \delta(k+2nl_g))$$

$$\tilde{P}_{60°P,FBG}(k) \propto E_{o60°P}(k_g)E_{g60°P,max}\Pi(n\beta)e^{-ifk_g}$$
$$(\delta(k-2nl_g)+\delta(k+2nl_g))$$

$$\tilde{P}_{120°P,FBG}(k) \propto E_{o120°P}(k_g)E_{g120°P,max}\Pi(n\beta)e^{-ifk_g}$$
$$(\delta(k-2nl_g)+\delta(k+2nl_g)) \quad (10)$$

The $E_{gXXP,max}$ terms in Equation (10) represent the peak value of the respective electric field components reflecting back from the FBG and $\beta$ represents the physical length of the FBG in the sensing fiber. The values of the products $(E_{oLHP}(k_g)E_{gLHP,max})$, $(E_{o60°P}(k_g)E_{g60°P,max})$, $(E_{o120°P}(k_g)E_{g120°P,max})$ are determined from the Fourier transformed sets. The signal at the zero angle photodetector may be written as:

$$P_{LHP}=E_{0x}^2 \quad (11)$$

Similarly, the signals at the other two photodetectors can be written directly as the square of the electric field component along the axis of each filter:

$$P_{L60°}=E_{60°P}^2 \quad (12)$$

$$P_{L120°P}=E_{120°}^2 \quad (13)$$

The values of the products $(E_{oLHP}(k_g)E_{gLHP,max})$, $(E_{o60°P}(k_g)E_{g60°P,max})$, $(E_{o120°P}(k_g)E_{g120°P,max})$ are determined from the Fourier transformed sets. The values of the broad-band reflected signals along each axis of the linear filters 204, 206, 208 (the terms, $E_{oLHP}(k_g)$, $E_{oLHP}(k_g)$, $E_{o120°P}(k_g)$ are easily found using the filtered result of the OFDR sampled data as shown previously in Equation (3).

Taking the square-root of the three different filtered signals gives a set of electric field component along the polarization axis vs. wavenumber for each linearly polarized axis. Determining the exact value of the broad-band axial electric field component at the FBG maximum reflection wavenumber is simply an interpolation operation. The products found in the Fourier transform result and the broad-band components are then easily manipulated to determine $E_{gLHP,max}$, $E_{g60°P,max}$, and $E_{g120°P,max}$. Those components are then squared to give the virtual signals $P_{LHP}$, $P_{60°P}$, $P_{120°P}$. The polarization parameters are then determined using Equations (5), (6), (7), and (8).

In the application of the preceding steps in a real-world setting, there may be several FBGs (e.g., 100's) in a single fiber; however, the method is the same. Rewriting Equation (10) to represent a more realistic application in which a sensing fiber contains G number of FBGs gives:

$$\tilde{P}_{LHP}(k) \propto \Sigma_{g=1}^{G} E_{oLHP}(k_g)E_{gLHP,max}\Pi(n\beta)e^{-ifk_g}$$
$$(\delta(k-2nl_g)+\delta(k+2nl_g))$$

$$\tilde{P}_{60°P}(k) \propto \Sigma_{g=1}^{G} E_{o60°P}(k_g)E_{g60°P,max}\Pi(n\beta)e^{-ifk_g}$$
$$(\delta(k-2nl_g)+\delta(k+2nl_g))$$

$$\tilde{P}_{120°P}(k) \propto \Sigma_{g=1}^{G} E_{o120°P}(k_g)E_{g120°P,max}\Pi(n\beta)e^{-ifk_g}(\delta(k-2nl_g)+\delta(k+2nl_g)) \quad (14)$$

The determination of the broad-band polarization parameters vs. wave number is only completed once per measurement while the determination of the $(E_{oLHP}(k_g)E_{gLHP,max})$, $(E_{o60°P}(k_g)E_{g60°P,max})$, $(E_{o120°P}(k_g)E_{g120°P,max})$ product terms and the parameters in Equation (11)-(13) and Equation (3) are repeated for each FBG at which a polarization measurement is desired. The result is a measurement of the polarization parameters, or polarization state, of the light reflected from each FBG at the location of each FBG along the fiber.

The steps detailed above rigorously provide the mathematical basis for the method. In the practical application of the method to produce the example data shown later, it was found that the filtered broad-band signals of each detector/amplifier output can actually be normalized and the normalization multiplier can be applied to the sampled set of each detector. Referring back to eq. 1, the broad-band reflected signal serves as a direct multiplier for the FBG electric field in each polarization axis. Normalizing each of the three polarization components of the broad-band artificially circularizes the broad-band polarization state. If $\eta$ represents the normalization value (can be 1, or 100, or whatever . . . this is generally chosen according to software precision and user preferences), a multiplier for each signal can be formed using:

$$B_{LHP}(k) = \frac{\eta}{E_{oLHP}(k)} \quad (15)$$

$$B_{60°P}(k) = \frac{\eta}{E_{o60°P}(k)}$$

$$B_{120°P}(k) = \frac{\eta}{E_{o120°P}(k)}$$

Multiplying the sampled set by the respective normalization multipliers changes the product terms of Equation (14) to:

$$\tilde{P}_{LHP}(k) \propto \eta \Sigma E_{gLHP,max}\Pi(n\beta)e^{-ifk_g}(\delta(k-2nl_g)+\delta(k+2nl_g))$$

$$\tilde{P}_{60°P}(k) \propto \eta \Sigma_{g=1}^{G} E_{g60°P,max}\Pi(n\beta)e^{-ifk_g}(\delta(k-2nl_g)+\delta(k+2nl_g))$$

$$\tilde{P}_{120°P}(k) \propto \eta \Sigma_{g=1}^{G} E_{g120°P,max}\Pi(n\beta)e^{-ifk_g}(\delta(k-2nl_g)+\delta(k+2nl_g)) \quad (16)$$

The normalization variable does not have to be considered in the determination of the polarization parameters at each FBG and the relative values of $E_{gLHP,max}$, $E_{g60°P,max}$, and $E_{g120°P,max}$ are directly discerned from the Fourier transform result and Equations (5)-(8) are used as previously explained to determine the polarization state at each FBG.

The absolute magnitude of the electric field at each FBG is not determined using the previously detailed algorithms and the polarization parameters $\delta$, $\Psi$, and $\chi$ are actually relative to the polarization state at the broad-band reflector. The ratio of $E_{0x}$ to $E_{0y}$ is measured absolutely. Having the relative polarization information at each FBG along a sensing fiber leads to the measurement of distributed birefringence in the sensing fiber. With the polarization state known at each FBG along the fiber, the birefringence along the fiber can be determined. The polarization changes between each FBG along the fiber are due to birefringent effects in the fiber. The Jones vector at an FBG can be expressed in terms of a Jones matrix describing the birefringence and the Jones vector at the prior FBG:

$$E_g = J(\beta,\theta)E_{g-1} \quad (17)$$

The birefringent parameter $\theta$ is the angle of the fast (or unaffected in the representation of Equation (18)) axis with respect to the assumed x-axis of the fiber cross section ($\theta+\pi/2$ is the angle of the slow, or delayed, axis with respect to the assumed x-axis of the fiber cross section) and the birefringent parameter $\beta$ is the delay of the birefringent fiber. The explicit form of the Jones matrix is:

$$J(\beta,\theta) = \begin{bmatrix} \cos\frac{\beta}{2}+i\sin\frac{\beta}{2}\cos2\theta & i\sin\frac{\beta}{2}\sin2\theta \\ i\sin\frac{\beta}{2}\sin2\theta & \cos\frac{\beta}{2}-i\sin\frac{\beta}{2}\cos2\theta \end{bmatrix} \quad (18)$$

The solution of β and θ between consecutive FBGs along the entire sensing fiber can be determined by solving:

$$-E_{xOr}(A)+E_{yOi}(C)+E_{xIr}(a)=0$$

$$-E_{xOr}(B)-E_{yOr}(C)+E_{xIr}(b)=0$$

$$-E_{yOr}(A)-E_{yOr}(B)+E_{yIr}(a)-E_{yIi}(b)=0$$

$$-E_{yOi}(A)+E_{yOr}(B)-E_{xOr}(C)+E_{yIi}(a)+E_{yIr}(b)=0$$

$$a^2+b^2-1=0 \tag{19}$$

The variables a and b are used in the solution of the set of linear equations, but they are not used in the final determination of birefringence. With A, B, and C determined, the following gives the birefringent information:

$$\beta = 2arcos(A) \tag{20}$$

$$\theta = \frac{1}{2}\arctan\left(\frac{C}{B}\right)$$

The birefringence measurements along the fiber are indexed to length along the fiber and can be formally represented as:

$$\beta(k)$$

$$\theta(k) \tag{20}$$

The primary source of error in the implementation of the various embodiments disclosed herein may be the OFDR system itself. The assumptions made to derive and simplify the equations and theory have minimal deteriorating effects on the measurement outcome. Because OFDR systems contain analog amplification and sampling electronics, they will inherently have some maximum signal-to-noise ratio. In the case of algorithm implementation, as with any other process, a greater signal-to-noise ratio gives greater accuracy. Also affecting the measurement are the ability of the FBGs to reflect light back to the OFDR. Undesirable situations that can deteriorate the arrival of signals back to the OFDR include damaged fiber optic cables and FBG deterioration due to high temperatures in the testing environment. The quality of the polarization diverse detector will affect the quality of the polarization parameter measurement. Misalignment in the orientation of the linear polarization filters will also affect the calculation of the polarization parameters, as the specific angular orientation of the filter in preceding each detector in the scheme must be known for the algorithms to sufficiently give a solution.

FIGS. 4, 5, 6, 7, 8, 9, and 10 show the results of interrogating one core of a three-core optical fiber in a non-twisted state and a twisted state to illustrate the effectiveness of the various embodiments.

Figure 4:
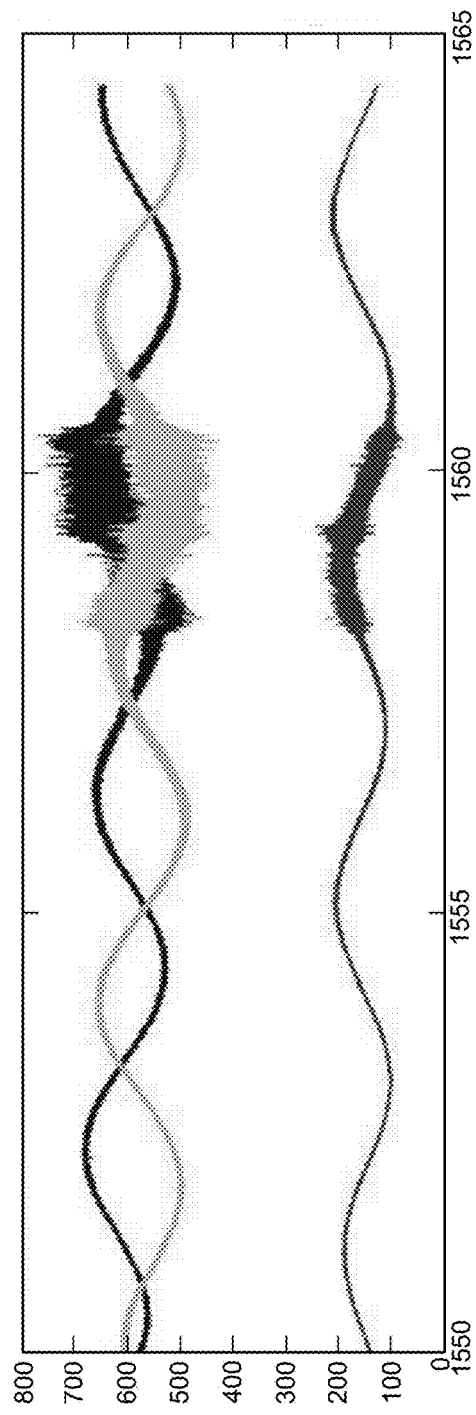
FIG. 4 is a graph of raw reflection versus wavelength data.

Using the embodiment methods described above, the three channels were sampled using a traditional OFDR architecture with the exception of the sensing fiber being spit between the 3 linearly-polarized filter photo-detectors as detailed in FIG. 2. FIG. 4 shows the "raw" data sample vs. wavelength. The results of applying the low-pass filter to the sampled return is shown in FIG. 5.

Figure 5:
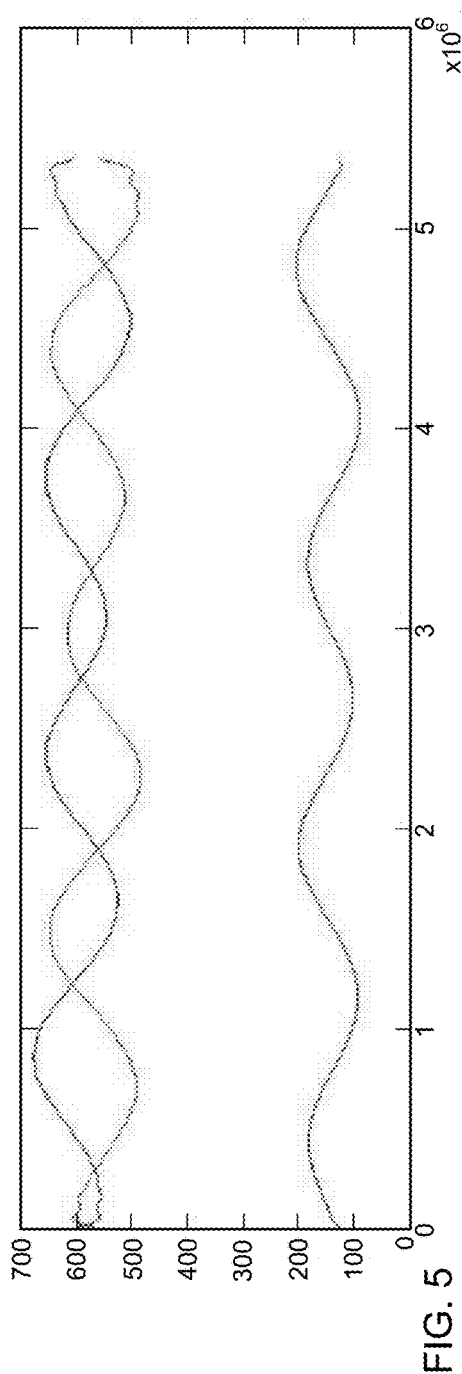
FIG. 5 is a graph of lowpass filtered raw data.
Figure 6:
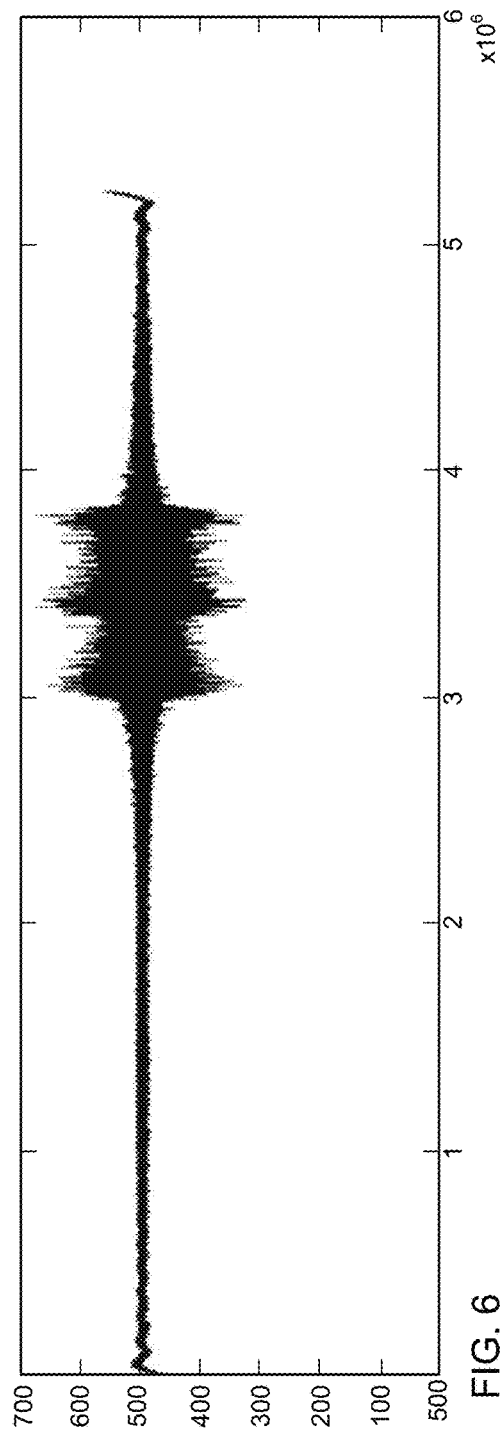
FIG. 6 is a graph of a LHP signal after normalization.
Figure 7:
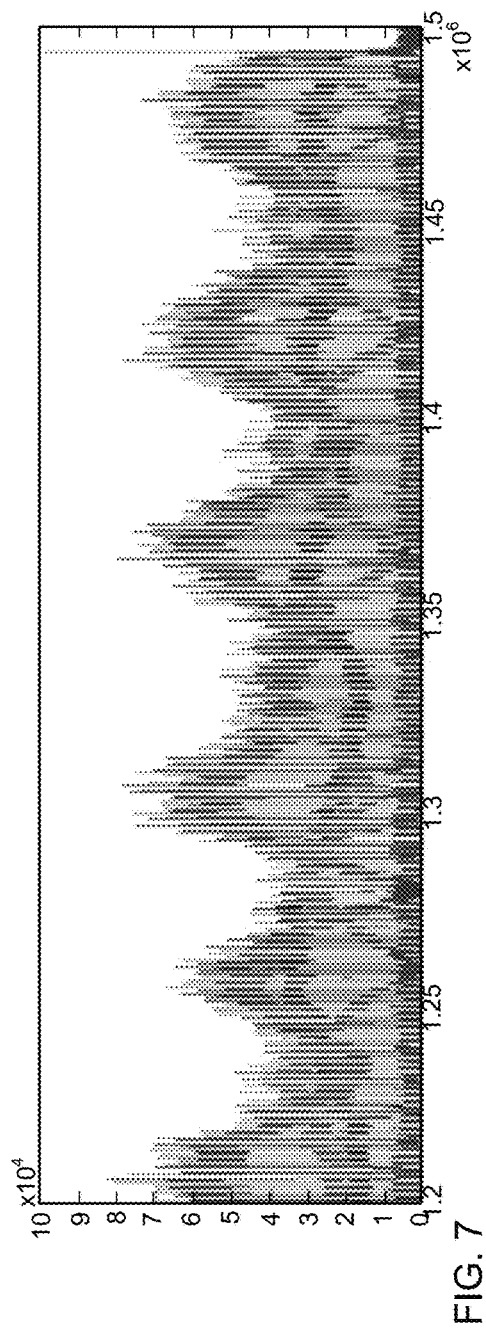
FIG. 7 is a graph of Fourier transform results of three polarization components.
Figure 8:
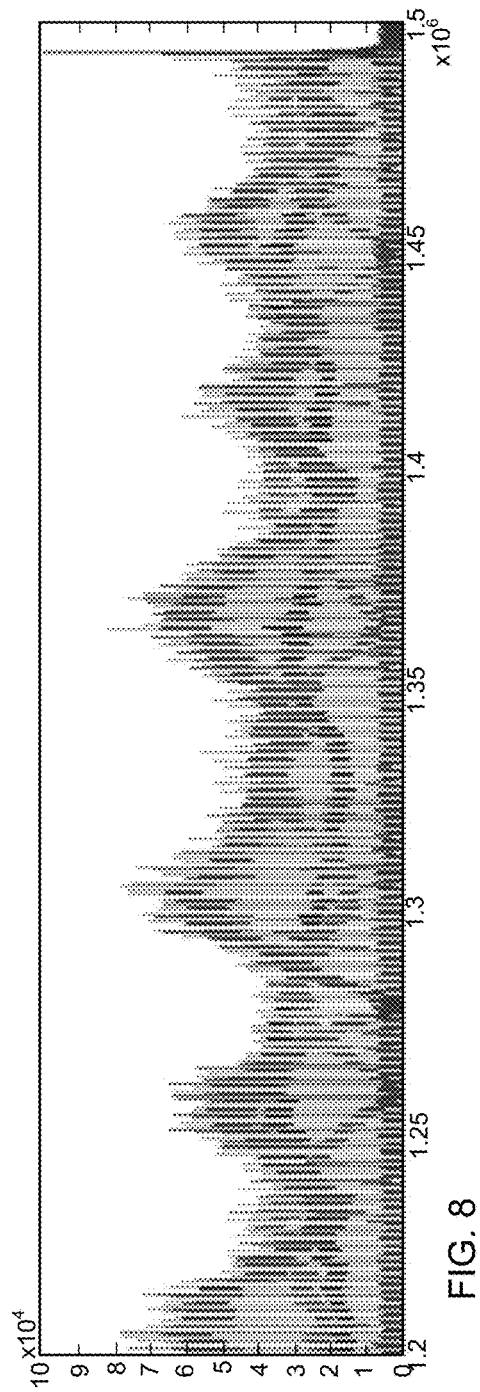
FIG. 8 is a graph of Fourier transform results of 3-axis detection of a twisted fiber.

The x-axis of FIG. 5 and most of the following illustrations in FIGS. 6-10 have not been scaled. FIG. 5 is the low-pass filtered raw data of each linearly filtered polarization channel for one sensing fiber (one core of the 3-core fiber). Each signal in FIG. 5 represents $E_{oLHP}^2(k)$, $E_{o60°P}^2(k)$, $E_{o120°P}^2(k)$. In the results used in this illustration, the normalization process was implemented to simplify processing. Because overlaying the three channels is difficult to view, only one channel is shown here after normalization in FIG. 6. The Fourier transform result (magnitude) of the sampled data after normalization is show in FIG. 7. To illustrate the effect of twisting on one core of the three core fiber, the Fourier transform result of a twisted fiber is shown in FIG. 8.

Figure 9:
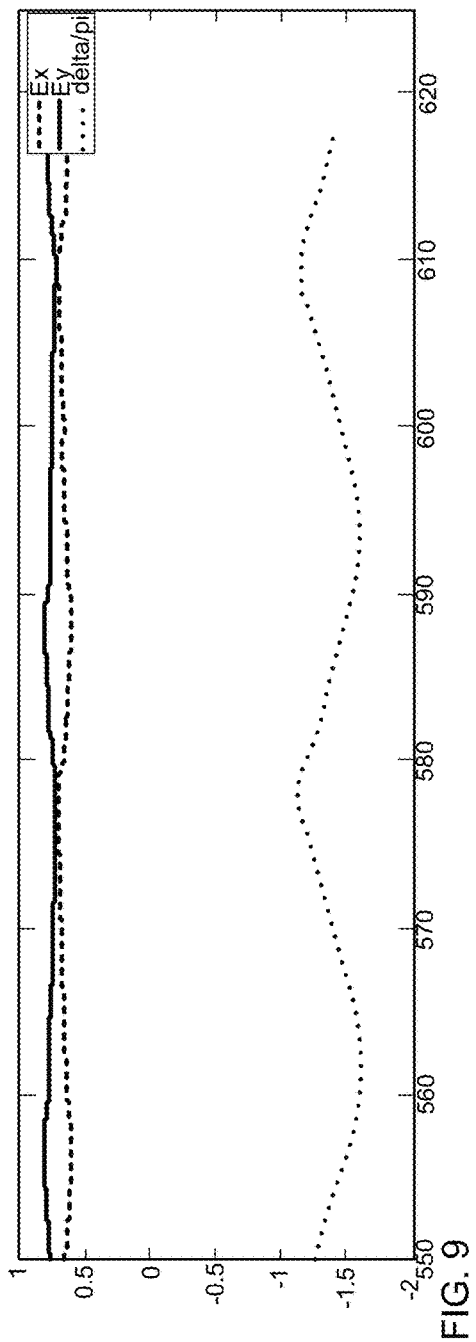
FIG. 9 is a graph of untwisted polarization parameters.

The twisted section of the fiber starts at approximately $1.4 \times 10^5$ in FIG. 8. It is evident to the human eye that the polarization components have changed as a result of twisting the fiber. The polarization parameters of the non-twisted and twisted fiber are shown in FIGS. 9 and 10, respectively.

Figure 10:
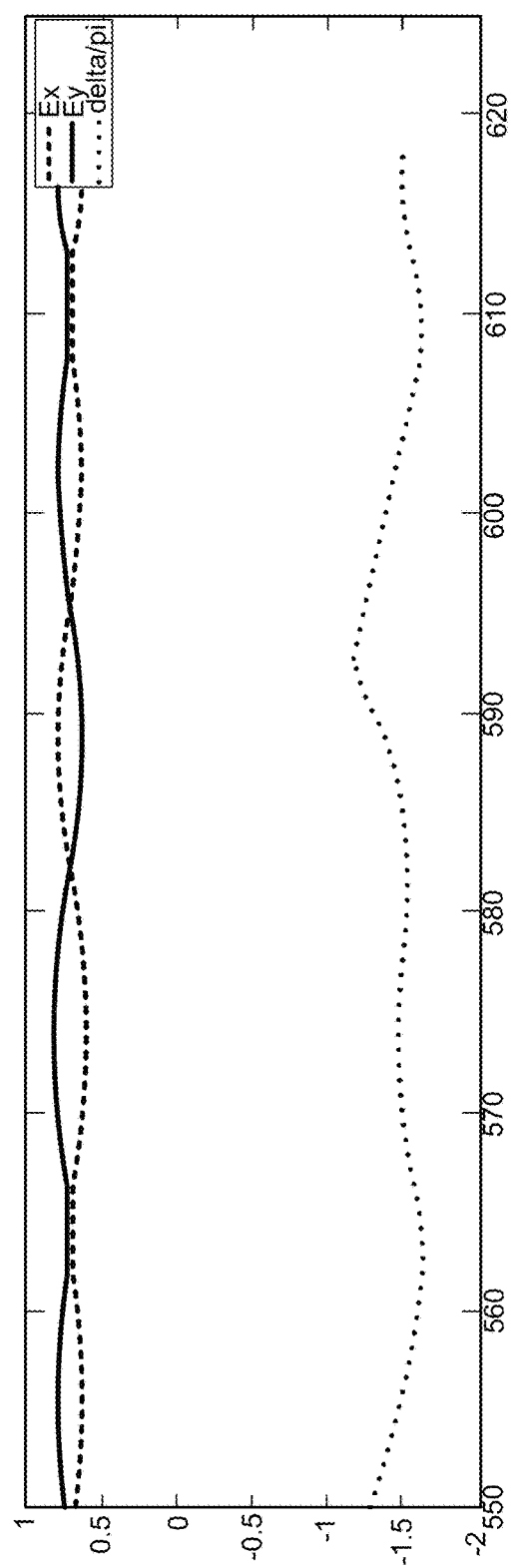
FIG. 10 is a graph of twisted polarization parameters.

FIGS. 8 and 10 show the effect of twisting the fiber on the polarization of the light at each FBG. The x-axes of FIGS. 8 and 10 are indexed by FBG down the length of the fiber. The two graphs illustrate the ability of the various embodiments to measure the change in polarization due to changing birefringence effects. The twisting of the fiber begins at approximately FBG number 560 in FIG. 10. The phase delay, δ, between the x- and y-components of the Jones vector is divided by pi in both graphs for easier viewing. All three polarization parameters, Ex, Ey, and δ are altered as a result of the twisting. The preliminary estimation of minimum polarization independence using three equally spaced (angularly) linearly polarized filters per sensing fiber is 66% signal-to-noise ratio compared to maximum interference. This compares very favorably to the zero signal to noise ratio that is possible in 2-axis detection schemes previously reported.

The collecting of returning data from the broad-band reflector and sensing fiber may be accomplished in more involved methods than the simple scheme discussed above. While the examples discussed in relation to FIGS. 1 and 2 use three different polarization filter angular orientations equally spaced from one another, more than three may be used in various embodiments and the angular orientations do are not required to be equally spaced angularly. The Equations (1)-(21) apply to linear filters at any angular orientation.

Additionally, some OFDR arrangements do not use a broad-band reflector, but instead combine light returning from a sensing fiber with a second leg of light inside the OFDR unit itself. In such situations, any combination of splitters and couplers can be used to achieve the polarization diverse arrangement. The algorithms discussed herein still apply.

In alternate embodiment includes a processing arrangement in which not every point collected is processed. For instance, instead of determining the polarization parameters of the broad-band reflector at every wavenumber index, a decimation routine of some sort to shorten processing time and increase measurement throughput may be implemented.

While the example data shown in this disclosure was processed using processor-intensive DSP methods, the algorithms apply to high-speed OFDR systems in which short-time Fast Fourier Transform methods are used to increase measurement throughput. In a system such as that, there is inherent decimation in the DSP processing. The algorithms discussed herein still apply. In general terms the segments of sampled data from each detector/amplifier circuit may be individually averaged to determine the broad-band responses in each linear polarization filter in real-time and the Fourier transform results give the FBG broad-band product terms in real-time. The FBG electric field components may be found in real-time by either: 1) normalizing the broad-band measurements and applying the normalization to the short-time segments to normalize the FBG polarization component product terms; or by 2) dividing the broad-band electric field components of each axis (found by averaging each polarization component segmented data) into the FBG product terms in the Fourier transform of each short-time segment. The peak reflection wavenumber of each sensing point along the fiber may be easily determined by parallel-summing the results of each short-time Fourier result and doing peak detection vs. wavenumber as is done in the short-time method of high-speed processing OFDR reflection data. These particular alternate embodiments may leverage the OFDR processing methods detailed in the U.S. Pat. No. 8,700,358, the entire contents of which are incorporated by reference herein for all purposes.

The full characterization of the polarization state along the fiber may not be needed in every implementation. The information at each FBG may simply be combined to make a true polarization-diverse OFDR measurement.

The uses of the distributed FBG polarization states along a sensing fiber are many. A distributed birefringent calculation can be made, which lends to pressure sensors, chemical sensors, and twisting and bending sensing as in a multi-core shape sensing fiber arrangement.

Figure 11:
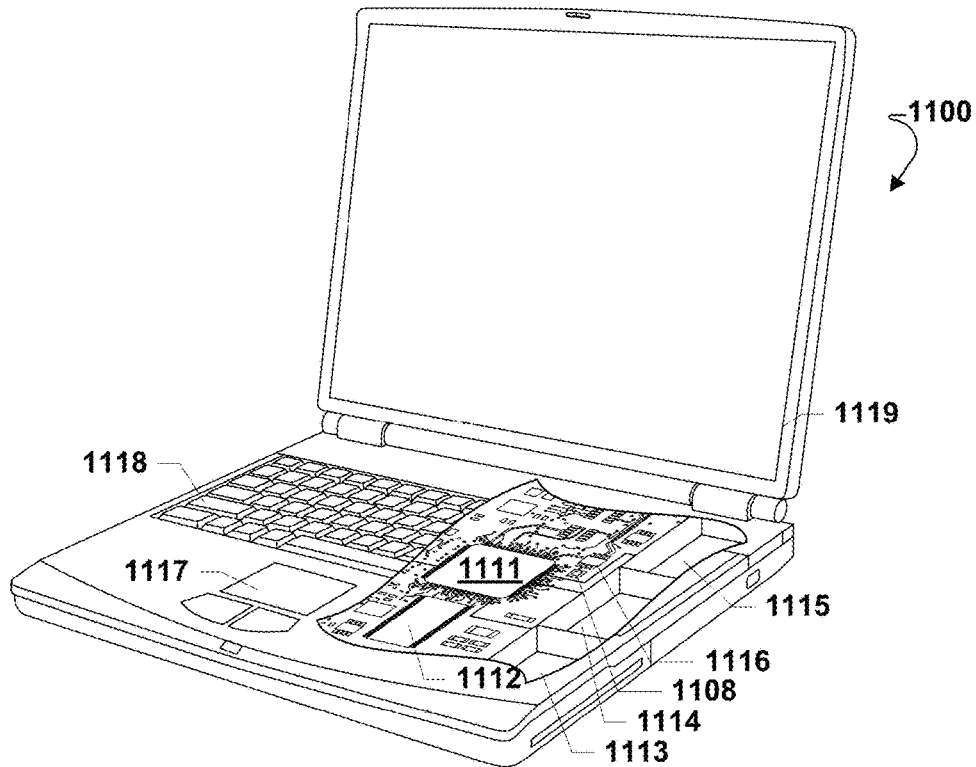
FIG. 11 is a component block diagram of a laptop that is a computing device suitable for use in the various embodiments

The various embodiments described above may also be implemented within a variety of computing devices, such as a laptop computer 1100 illustrated in FIG. 11. Many laptop computers include a touchpad touch surface 1117 that serves as the computer's pointing device, and thus may receive drag, scroll, and flick gestures similar to those implemented on mobile computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antennas 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the mobile computing device may include a computer mouse or trackball coupled to the processor (e.g., via a USB input) as are well known, which may also be used in conjunction with the various embodiments.

The processor 1111 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processor 1111. The processor 1111 may include internal memory sufficient to store the application software instructions. In many devices, the internal memory may be a volatile or nonvolatile memory, such as flash memory, or a mixture of both. For the purposes of this description, a general reference to memory refers to memory accessible by the processor 1111 including internal memory or removable memory plugged into the device and memory within the processor 1111 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An Optical Frequency Domain Reflectometer (OFDR) system, comprising:
    a broad-band reflector;
    a sensing fiber;
    a splitter configured to receive light returned from the broad-band reflector and sensing fiber;
    a first linear polarization filter configured to receive a first portion of the received light from the splitter;
    a second linear polarization filter configured to receive a second portion of the received light from the splitter; a third linear polarization filter configured to receive a third portion of the received light from the splitter; and
    a computing device configured to determine a sensing fiber birefringence measurement based at least in part on measurements of outputs of the first linear polarization filter, the second linear polarization filter, and the third linear polarization filter.

2. The system of claim 1, wherein the first linear polarization filter, the second linear polarization filter, and the third linear polarization filter each have different angular orientations.

3. The system of claim 2, wherein the different angular orientations are not equally spaced.

4. The system of claim 2, wherein the different angular orientations are equally spaced.

5. The system of claim 4, wherein the different angular orientations are 0°, 60°, and 120°.

6. The system of claim 1, further comprising a fourth linear polarization filter configured to receive a fourth portion of the received light from the splitter, wherein the computing device is further configured to determine the sensing fiber birefringence measurement based at least in part on measurements of outputs of the first linear polarization filter, the second linear polarization filter, the third linear polarization filter, and the fourth linear polarization filter.

7. The system of claim 1, wherein the computing device is further configured to output an indication of the sensing fiber birefringence measurement versus a length of the sensing fiber.

8. The system of claim 7, wherein the OFDR system a component of a pressure measurement system, a temperature measurement system, a chemical measurement system, or a position measurement system.

9. The system of claim 1, wherein determining the sensing fiber birefringence measurement comprises executing a decimation routine to determine polarization parameters of outputs of the first linear polarization filter, the second linear polarization filter, and the third linear polarization filter at less than every wavenumber index.

10. A method for Optical Frequency Domain Reflectometer (OFDR), comprising:
    receiving light returned from a broad-band reflector and sensing fiber at a splitter and generating a first portion of the received light from the splitter, a second portion of the received light from the splitter, and a third portion of the received light from the splitter;
    receiving the first portion of the received light at a first linear polarization filter;
    receiving the second portion of the received light at a second linear polarization filter;
    receiving the third portion of the received light at a third linear polarization filter; and
    determining a sensing fiber birefringence measurement based at least in part on measurements of outputs of the first linear polarization filter, the second linear polarization filter, and the third linear polarization filter.

11. The method of claim 10, wherein the first linear polarization filter, the second linear polarization filter, and the third linear polarization filter each have different angular orientations.

12. The method of claim 11, wherein the different angular orientations are not equally spaced.

13. The method of claim 11, wherein the different angular orientations are equally spaced.

14. The method of claim 13, wherein the different angular orientations are 0°, 60°, and 120°.

15. The method of claim 10, further comprising:
    generating a fourth portion of the received light from the splitter; and
    receiving the fourth portion of the received light at a fourth linear polarization filter,
    wherein determining the sensing fiber birefringence measurement based at least in part on measurements of outputs of the first linear polarization filter, the second linear polarization filter, and the third linear polarization filter comprises determining the sensing fiber birefringence measurement based at least in part on measurements of outputs of the first linear polarization filter, the second linear polarization filter, the third linear polarization filter, and the fourth linear polarization filter.

16. The method of claim 10, further comprising outputting an indication of the sensing fiber birefringence measurement versus a length of the sensing fiber.

17. The method of claim 10, wherein determining the sensing fiber birefringence measurement comprises executing a decimation routine to determine polarization parameters of outputs of the first linear polarization filter, the second linear polarization filter, and the third linear polarization filter at less than every wavenumber index.

* * * * *